Dec. 29, 1959  J. P. PIERCY  2,918,829
NON-CREEP THROTTLE CONTROL
Filed Jan. 31, 1957
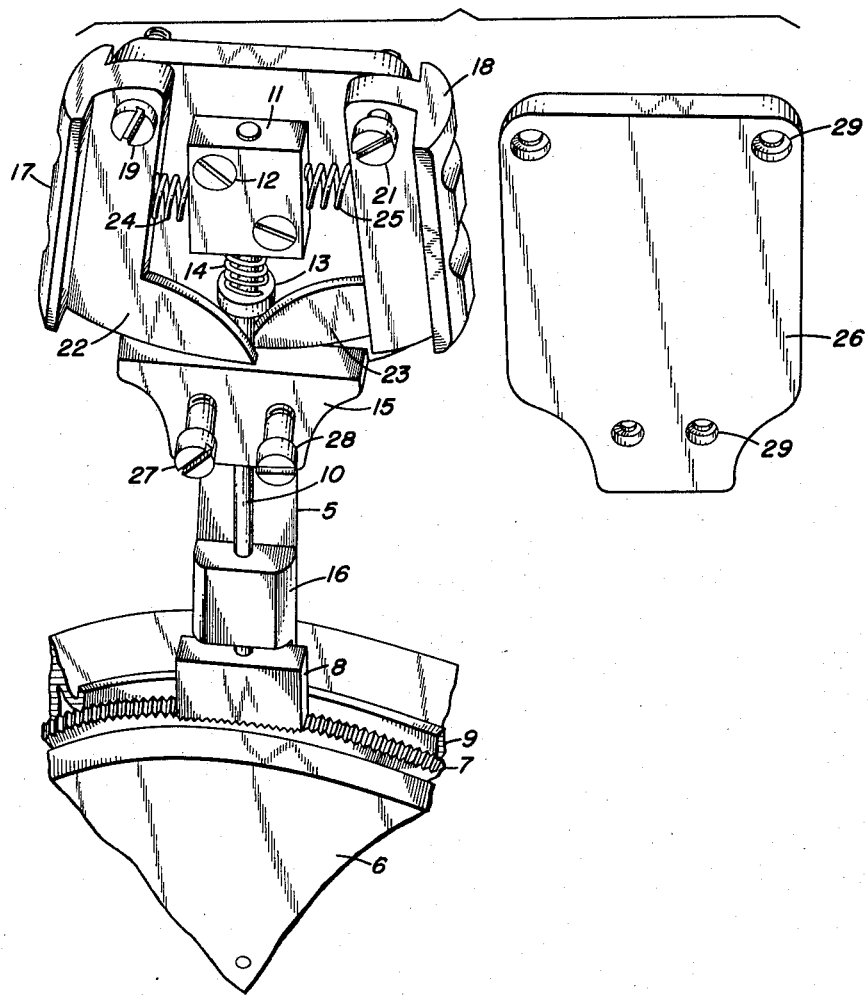
INVENTOR.
JOHN P. PIERCY
BY
ATTORNEYS 2,918,829

NON-CREEP THROTTLE CONTROL

John P. Piercy, Jacksonville, Fla.

Application January 31, 1957, Serial No. 637,599

4 Claims. (Cl. 74—538)

(Granted under Title 35, U.S. Code (1952), sec. 266)

The invention described herein may be manufactured and used by or for the Government of the United States of America for governmental purposes without the payment of any royalties thereon or therefor.

The present invention relates to a non-creep throttle control and more particularly to a non-creep throttle control having a cam controlled serrated shoe arrangement which prevents creeping and allows the throttle to be moved to any position.

One widely used construction to prevent the throttle of aircraft engines from inadvertent movement or creeping comprises a friction screw and spider arrangement. In this construction, tightening the friction screw transmits additional friction to a spider, and therefore to the moving and stationary parts of a quadrant.

The major disadvantages of this known construction are that in the event that the operator forgets to tighten the friction screw sufficiently, the throttle would inadvertently creep to the closed position, thereby permitting the engine to lose power. This could be particularly disastrous if it occurred just after take-off, or at any time when the aircraft is flying at a low altitude with the engine developing high power. This pertains to all take-offs and landings, but is particularly critical for carrier-based aircraft during the periods of approach, wave-off, and catapulting when the pilot has to remove his hand from the throttle to operate the flaps, the landing gear, the tail hooks, etc.

Another undesirable feature is that when the friction screw is tightened sufficiently to prevent "creeping" of the throttle, it is extremely difficult to make minute adjustments of the throttle control. This occurs mostly during formation flying when radical changes of the throttle setting are unnecessary. Movement of the throttle in this type of mechanism must always be preceded by loosening of the friction screw and then by subsequent tightening. This means two unnecessary operations for the pilot who usually has many other tasks to perform during a flight.

The present invention overcomes the disadvantages noted above by providing a non-creep throttle control having a double acting cam arrangement engaging a spring biased rod connected to a multiple serrated shoe which mates with a segment gear which is integral with a quadrant. The cams are regulated by front and rear throttle grips which raise the rod and the shoe clear of the segment gear when pushed or pulled.

An object of the present invention is the provision of a throttle controller which prevents throttle creeping.

Another object is to provide a throttle controller that can be adjusted either minutely or to a large extent.

A further object of the invention is the provision of a throttle controller that can be placed in various height positions and is easily actuatable therefrom.

Still another object is to provide a throttle controller which is simple to operate, reliable in use and not complicated to construct.

A final object is to provide a throttle controller which can be moved to varied positions and minutely adjusted in each position.

Other objects and many of the attendant advantages of this invention will be readily appreciated as the same becomes better understood by reference to the following detailed description when considered in connection with the accompanying drawings wherein the sole figure shows a partially exploded perspective view of the invention.

Referring now to the drawings, there is shown a throttle controller having a longitudinally extending lever 5 pivotally mounted to a quadrant 6.

The quadrant 6 is provided with a serrated segment gear 7 which mates with a serrated foot 8. The lever 5 travels rearwardly and forwardly in a guideway 9 provided in quadrant 6.

The shoe 8 is fixed to the lower end of a rod 10 and is adapted to move up and down therewith. The upper end of rod 10 is slidably mounted in a bearing block 11 which is secured to lever 5 by screws 12.

A shoulder 13 is provided on the rod 10 below the bearing block 11. A compression spring 14 is coiled about rod 10 between the shoulder 13 and the lower surface of block 11. The spring 14 in its normal state provides sufficient compression on rod 10 to hold the serrated shoe 8 in mating position with the serrated segment gear 7.

Upper and lower rod guides 15 and 16, respectively, are fixed to lever 5 by any suitable means, to guide the rod 10 during its upward and downward travel.

Rearward and forward throttle grips 17 and 18, respectively, are pivotally mounted to the upper end of lever 5 by means of screws 19 and 21, respectively. The lower ends of grips 17 and 18 are provided with oppositely facing cams 22 and 23, respectively, which are adapted to engage the shoulder 13 on opposite sides of rod 10.

Compression springs 24 and 25 are mounted between the block 11 and the inner surfaces of grips 17 and 18, respectively, to hold the cams 22 and 23 out of engagement with the shoulder 13 when the grips 17 and 18 are in their normal position as shown in the drawing.

A cover plate 26 may be secured to the lever 5 by means of screws 19, 21, 27 and 28 cooperating with the openings 29 in the plate.

In operating the controller, the grips 17 and 18 are compressed inwardly against the action of springs 24 and 25, moving the cams 22 and 23 into engagement with the shoulder 13. The shoulder 13 is then lifted upward compressing spring 14 and lifting the rod 10 and shoe 8 whereby the shoe 8 is disengaged with the serrated segment gear 7. The grips 17 and 18 can both be compressed or either of the grips 17 or 18 can be compressed to lift the shoe 8 out of engagement with gear 7.

Therefore, when the pilot desires to advance the throttle, he need only push against the rear throttle grip 17 which raises the shoe 8 clear of the segment gear 7 and allows the throttle to be moved to any desired forward setting. When the pilot releases the grip 17, the spring biased rod 10 moves the serrated shoe 8 back into engagement with the gear 7 to prevent creeping. When the pilot desires to retard the throttle, he merely pulls against the forward throttle grip 18 which also actuates the shoe 8 and allows the throttle to be moved to any desired rearward setting.

It is readily seen that the shoe 8 is quickly returned into mating position with gear 7 when the operator removes his hand from the grips 17 and 18 due to the three point spring loading of the rod 10. It is to be understood that although compressing the grips 17 and 18 to actuate the lifting of the shoe 8 is the desirable method for throttle movement, in an emergency the throttle can be moved in either direction without actuating the grips 17 and 18 by hitting the lever 5 on the top part with the palm of the hand or the inner surfaces of the fingers. This enables the pilot to advance or retard the throttle in an emergency without conscious thought of actuating the grips.

It should be noted that the present invention can be placed in various height positions and still be easily actuated. Two common positions for a throttle control are: in the vertical plane of the pilot's body and below his seating level or forward of the pilot's body and approximately on level with his waist. In either position, the throttle controller can easily be actuated either forwardly or rearwardly with a minimum of effort.

Obviously many modifications and variations of the present invention are possible in the light of the above teachings. It is therefore to be understood that within the scope of the appended claims the invention may be practiced otherwise than as specifically described.

What is claimed is:

1. A non-creep throttle controller comprising a support having serrations on the edges thereof, a lever pivotally mounted to said support, a serrated shoe adapted to mate with said serrated support, a spring biased rod slidably mounted on said lever and having its lower end fixed to said shoe, a bearing block secured to said lever and slidably mounting the upper end of said rod, a shoulder fixed to said rod below the lower surface of said block, at least one spring biased cam operatively connected to said lever for engagement with said shoulder, and means comprising at least one throttle grip pivotally connected to said lever and integral with said cam whereby said shoe is disengaged from said support when said means is actuated.

2. A non-creep throttle controller comprising a support having serrations on the edges thereof, a lever pivotally mounted on said support, a serrated shoe adapted to mate with said serrated support, a spring biased rod slidably mounted on said lever and having its lower end fixed to said shoe, a bearing block secured to said lever and slidably mounting the upper end of said rod, a shoulder fixed to said rod below the lower surface of said block, a pair of oppositely facing spring biased cams operatively connected to said lever for engagement with said shoulder, and means integral with said cams and pivotally connected to said lever for moving said cams into engagement with said shoulder whereby said shoe is adapted to be disengaged from said support.

3. A non-creep throttle controller comprising a support having serrations on the edges thereof, a lever pivotally mounted on said support, a serrated shoe adapted to mate with said serrated support, a spring biased rod slidably mounted on said lever and having its lower end fixed to said shoe, a bearing block secured to said lever and slidably mounting the upper end of said rod, a shoulder fixed to said rod below the lower surface of said block, a pair of oppositely facing spring biased cams operatively connected to said lever for engagement with said shoulder, and a pair of throttle grips pivotally connected to said lever and integral with said pair of cams for moving said cams into engagement with said shoulder whereby said shoe is adapted to be disengaged from said support.

4. A non-creep throttle controller comprising a support having serrations on the edges thereof, a lever pivotally mounted on said support, a serrated shoe adapted to mate with said serrated support, a rod, the lower end of said rod fixed to said shoe, a bearing block secured to said lever and slidably mounting the upper end of said rod, a shoulder fixed to said rod below the lower surface of said block, a spring coiled about said rod between said shoulder and said block and normally holding said shoe in mating position with said support, first and second cams oppositely disposed to each other pivotally connected to said lever adjacent said block and operatively cooperating with said shoulder, a first spring positioned between one side of said block and said first cam, a second spring positioned between the other side of said block and said second cam, said springs normally holding said cams out of engagement with said shoulder, means integral with said cams and pivotally connected to said lever for moving said cams into engagement with said shoulder whereby said shoe is adapted to be disengaged from said support.

References Cited in the file of this patent

UNITED STATES PATENTS

| | | |
|---|---|---|
| 220,269 | Boyd | Oct. 7, 1879 |
| 323,994 | Willison | Aug. 11, 1885 |
| 412,608 | Emerson | Oct. 8, 1889 |
| 787,843 | Honscheid | Apr. 18, 1905 |
| 1,160,002 | Schultz et al. | Nov. 9, 1915 |
| 1,333,092 | Peterson | Mar. 9, 1920 |
| 1,974,197 | Smith | Sept. 18, 1934 |
| 2,107,047 | Sandberg | Feb. 1, 1938 |
| 2,399,583 | Suska et al. | Apr. 30, 1946 |
| 2,544,866 | Travis | Mar. 13, 1951 |